United States Patent
Lo et al.

(10) Patent No.: US 10,491,736 B2
(45) Date of Patent: Nov. 26, 2019

(54) COMPUTER SYSTEM AND METHOD THEREOF FOR BLUETOOTH DATA SHARING BETWEEN UEFI FIRMWARE AND OS

(71) Applicant: American Megatrends Inc., Norcross, GA (US)

(72) Inventors: Chin-Sung Lo, Taipei (TW); Tsung-En Lin, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 83 days.

(21) Appl. No.: 15/688,386

(22) Filed: Aug. 28, 2017

(65) Prior Publication Data

US 2019/0068772 A1    Feb. 28, 2019

(51) Int. Cl.
*H04M 1/725* (2006.01)
*H04W 52/04* (2009.01)

(52) U.S. Cl.
CPC ......... *H04M 1/7253* (2013.01); *H04W 52/04* (2013.01); *H04M 2250/02* (2013.01)

(58) Field of Classification Search
CPC ........... H04M 1/7253; H04M 2250/02; H04W 52/04; G06F 21/35; G06F 21/575; G06F 9/4416; G06F 12/0238; G06F 21/53; G06F 21/6218; G06F 12/1433; G06F 12/1491

See application file for complete search history.

(56) References Cited

U.S. PATENT DOCUMENTS

| | | | |
|---|---|---|---|
| 2010/0299510 A1* | 11/2010 | Ueltschey | G06F 21/35 713/2 |
| 2012/0036308 A1* | 2/2012 | Swanson | G06F 12/1433 711/1 |
| 2016/0283404 A1* | 9/2016 | Xing | G06F 21/53 |
| 2016/0316370 A1* | 10/2016 | Boyapalle | G06F 9/4416 |
| 2018/0006815 A1* | 1/2018 | Young | G06F 21/575 |

* cited by examiner

*Primary Examiner* — Jianxun Yang
(74) *Attorney, Agent, or Firm* — Birch, Stewart, Kolasch & Birch, LLP (57) ABSTRACT

A computer system includes a memory and computer-readable instructions stored at the memory and executable by a microprocessor to: initiating power on mode in order to execute a UEFI firmware for OS boot up procedure; initiating pairing with a Bluetooth device; saving a pairing connection data of the Bluetooth device to memory; retrieving the pairing connection data under Operating System environment; and initiating automatic pairing with the Bluetooth device based on the pairing connection data.

21 Claims, 8 Drawing Sheets

| Field | Byte length | Byte offset | Description |
|---|---|---|---|
| Header | | | |
| Signature | 4 | 0 | 'ABCI'. Signature for AMI Bluetooth Connection Information. |
| Length | 4 | 4 | Length, in bytes, of the entire table |
| Revision | 1 | 8 | This value is 0. |
| Checksum | 1 | 9 | Entire table must sum to zero. |
| OEM ID | 6 | 10 | An OEM-supplied string that identifies the OEM. |
| OEM Table ID | 8 | 16 | An OEM-supplied string that the OEM uses to identify the particular data table. |
| OEM Revision | 4 | 24 | 1 |
| Creator ID | 4 | 28 | Vendor ID of utility that created the table. |
| Creator Revision | 4 | 32 | Revision of utility that created the table. |
| Bluetooth Device Address | 12 | 44 | Bluetooth Device Address. The Bluetooth Device Address of the device which is connected in UEFI Bluetooth Stack. |

| Offset | Name | Length | Value | Description |
|---|---|---|---|---|
| 0 | Type | BYTE | 88 | AMI Bluetooth Connection Information Table indicator. |
| 1 | Length | BYTE | Varies | Length of the structure |
| 2 | Handle | WORD | Varies | Handle or Instance number associated with this structure. |
| 4 | Bluetooth Device Address | 8 BYTES | Varies | Bluetooth Device Address. The Bluetooth Device Address of the device which is connected in UEFI Bluetooth Stack. |

| Variable Name | Attribute | Description |
|---|---|---|
| AMI_BT_INFO | NV, BS, RT | This variable contains the Bluetooth Device Address list that the Bluetooth Driver should connect without user intervention. |

FIG. 7B

| Offset | Name | Length | Description |
|---|---|---|---|
| 0 | Number of Bluetooth Device Address Entries | WORD | 1-based value to indicate the number of Bluetooth Device Entries. ZERO means no Bluetooth device are connected. |
| 2 | Bluetooth Device Address Entries | 8 BYTEs*N | Each Bluetooth Device Address Entry is 8 bytes long which holds a Bluetooth Device Address. N is 'Number of Bluetooth Device Address Entries' in offset 0. |

FIG. 7C

COMPUTER SYSTEM AND METHOD THEREOF FOR BLUETOOTH DATA SHARING BETWEEN UEFI FIRMWARE AND OS

BACKGROUND

1. Technical Field

The present disclosure generally relates to a computer system and method thereof for Bluetooth data exchange between a UEFI firmware and an Operating System; particularly, the present disclosure relates to a computer system and method thereof for exchange of Bluetooth device connection information between a UEFI firmware and an Operating System.

2. Description of the Related Art

Traditionally, computer systems may boot to an operating system. The boot up of the operating system is typically handled by a low level instruction code that is used as an intermediary between the hardware components of the computer system and the operating software and other high level software executing on the computer system. This low level instruction code is often known as the Basic Input/Output System ("BIOS") firmware and provides a set of software routines that allow high level software to interact with the hardware components of the computing system. The firmware performs routines for conducting Power-On Self Test ("POST") each time the computing system is powered on in order to test and initiate all hardware components in the computing system before handing off control to the operating system. These hardware components may include the system main memory, disk drives, and keyboards.

However, as technology has progressed with many devices such as peripheral devices advancing towards being wireless or cordless, boot up firmwares based on the traditional BIOS standard, which was originally designed for personal computers of International Business Machine Corporation (IBM), have become a point of restriction or limitation as to what the boot up firmware may control with respect to hardware and subsequently what hardware the Operating System may control. As new hardware and software technologies were being developed, this source of restriction became a major obstacle in the hardware-software interaction. As a result, a new standard of BIOS firmware has been proposed and widely adopted by many major industry leaders. This new standard is called the Unified Extensible Firmware Interface (UEFI).

With the adoption of UEFI standards, BIOS companies were able to produce UEFI firmware for computer systems, while companies producing Operating Systems were able to take advantage of the services these UEFI firmware provided by producing UEFI compliant Operating Systems.

However, separate development between the UEFI firmware and the Operating System have resulted in a information disconnect between the UEFI firmware and the Operating System with respect to I/O related hardware setup. With regards to I/O hardware setup, modern UEFI firmware generally still follow the old BIOS in that only I/O input devices such as wired keyboard or mouse can be easily setup for use during the pre-OS phase when the UEFI firmware has control. Generally, Bluetooth devices are unable to connect to the computer system when the UEFI firmware is being executed unless if the Bluetooth device is physically connected to the computer system via an adapter. In other circumstances, even if the Bluetooth device can be installed or paired with the computer system during the execution of the UEFI firmware the in the pre-OS environment, this pairing information is lost once the UEFI firmware hands over control of the computer system to the Operating System. Users would need to manually launch the OS specific Bluetooth device pairing process to make the Blue tooth device work under the Operating System environment. Conversely, if a Bluetooth device was first paired to the computer system in the Operating System, this pairing information is lost once the computer system is rebooted into the pre-OS environment of the UEFI firmware. Once again, the Bluetooth device would need to be manually and physically paired to the computer system under the UEFI firmware environment in order for the Bluetooth device to work. There is need for a more modern approach that allows Bluetooth information to be shared across the UEFI firmware and the Operating System in order to allow Bluetooth devices to be more integrated with the computer system.

SUMMARY

It is an objective of the present disclosure to provide a computer system and a method thereof for Bluetooth data to be shared between an UEFI firmware and an Operating System executed on the computer system.

It is another objective of the present disclosure to provide a computer system and a method thereof for increasing the ease and speed of pairing a Bluetooth device to the computer system as the computer system transitions between an UEFI firmware and an Operating System.

According to one aspect of the invention, a computer system includes a memory and computer-readable instructions stored at the memory and executable by a microprocessor to: initiating power on mode in order to execute a UEFI firmware for OS boot up procedure; initiating pairing with a Bluetooth device; saving a pairing connection data of the Bluetooth device to memory; retrieving the pairing connection data under Operating System environment; and initiating automatic pairing with the Bluetooth device based on the pairing connection data.

According to another aspect of the invention, a computer implemented method includes initiating power on mode in order to execute a UEFI firmware for OS boot up procedure; initiating pairing with a Bluetooth device; saving a pairing connection data of the Bluetooth device to memory; retrieving the pairing connection data under Operating System environment; and initiating automatic pairing with the Bluetooth device based on the pairing connection data.

DETAILED DESCRIPTION OF THE PREFERRED EMBODIMENT

Embodiments of the present invention provide methods and systems having an interface between an UEFI firmware and an Operating System exchange or sharing of Bluetooth information.

In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computer system and method thereof for sharing Bluetooth connection information or data between an UEFI firmware and an Operating System on the computer system. Preferably, the computer system includes (but not limited to) laptop computers, personal computers, computer servers, handheld computer devices such as mobile smart phones, tablet computers, and wearable computing devices.

Figure 1:
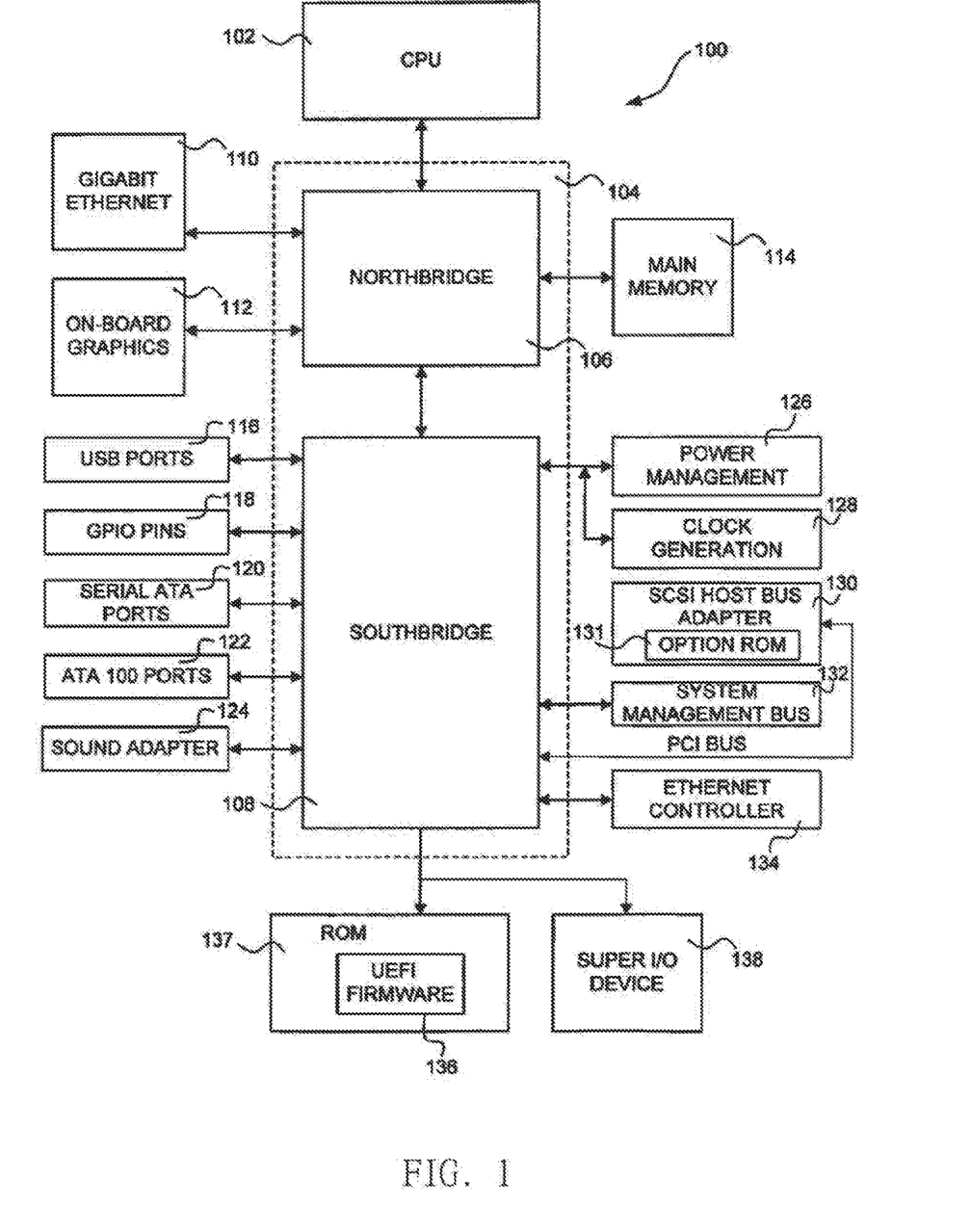
FIG. 1 is a view of an embodiment of a computer system of the present invention.

FIG. 1 and the following discussion are intended to provide a brief, general description of a suitable computing environment in which the invention may be implemented. However, those skilled in the art will recognize that the invention may also be implemented in other suitable computing environments.

Referring to FIG. 1, an illustrative computer architecture for practicing the embodiments discussed herein will be described. It should be appreciated that although the embodiments described herein are discussed in the context of a conventional desktop or server computer, the embodiments may be utilized with eventually any type of computing device. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM 137. In an alternative embodiment, the ROM 137 can be replaced by a non-volatile random access memory (NVRAM) such as a flash memory. The computer storage medium may be used for storing the firmware 136 that includes modules containing instructions and data that help to startup the computer system 100 and to transfer information between elements within the computer system 100. However, in other different embodiments, the firmware 136 may be stored in any other areas in the computer system 100.

The firmware 136 may include program code that is compatible with the UEFI specification. It should be appreciated that in addition to the firmware 136 including an UEFI-compatible firmware, other types and combinations of firmware may be included. For instance, the firmware 136 may include additionally or alternatively a BIOS firmware and/or other type of firmware known to those in the art. Additional details regarding the operation of the UEFI firmware 136 are provided below with respect to the subsequent diagrams. It should be appreciated that the computer system 100 may not include all of the components shown in FIG. 1, may include other components that are not explicitly shown in FIG. 1, or may utilize an architecture completely different than that shown in FIG. 1.

Figure 2:
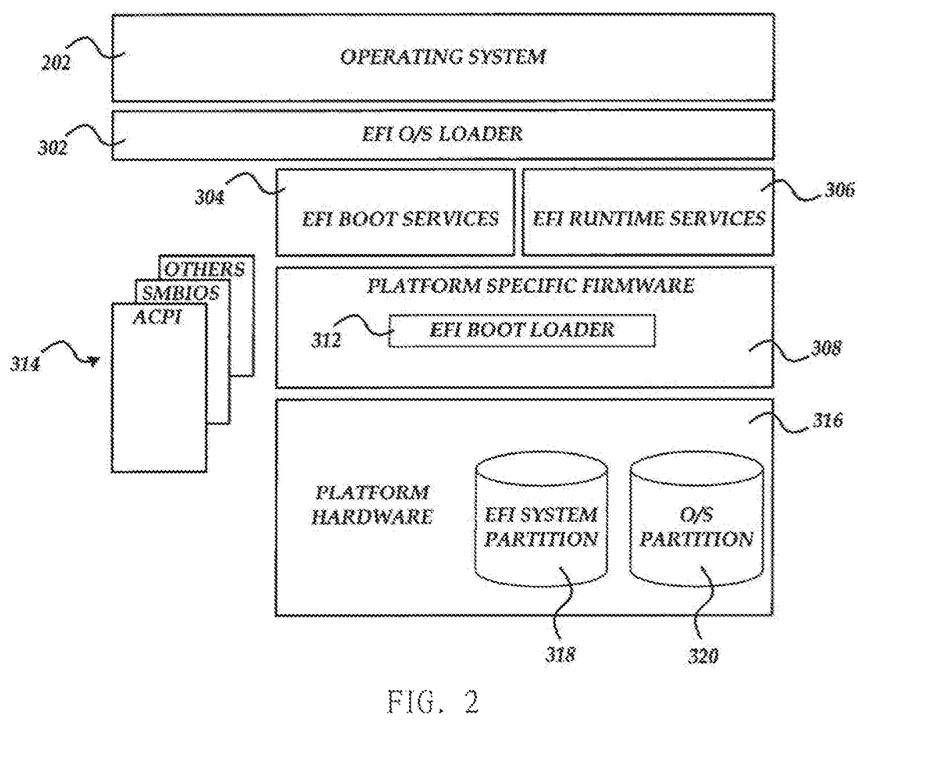
FIG. 2 is a view of an UEFI specification-compliant system.

Referring to FIG. 2, additional details regarding an UEFI specification-compliant system that may be utilized to provide an operating environment for the various implementations presented herein will be described. As shown in FIG. 2, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

EFI boot services 304 provide interfaces for devices and system functionality that can be used during boot time. EFI runtime services 306 are available to the OS loader 302 during the boot phase and to the operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services. Once the EFI firmware is initialized, it passes control to the boot loader 312.

Figure 3:
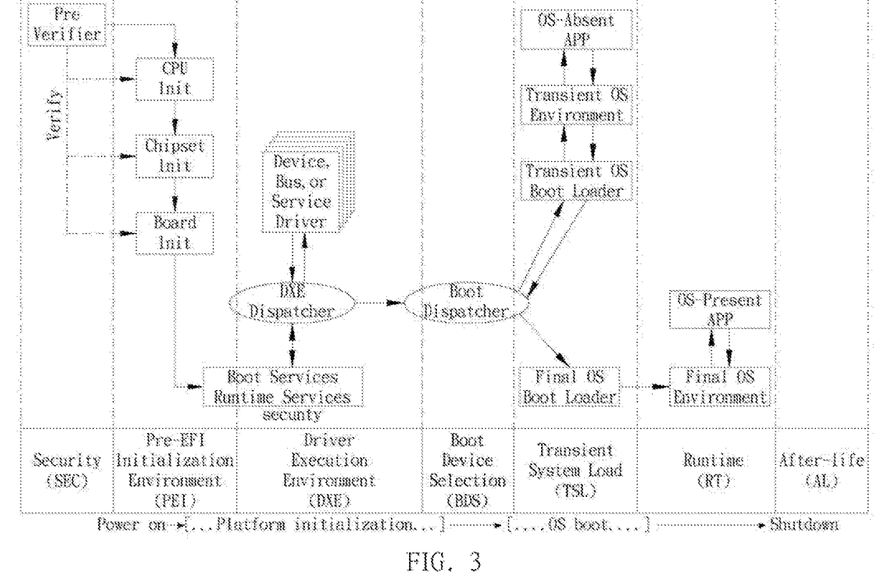
FIG. 3 is a view of the different phases during execution of an UEFI firmware.

Referring to FIG. 3, details are shown to illustrate the different phases or stages the UEFI firmware progresses through towards boot up of an Operating System. As shown in FIG. 3, when the computer system 100 is powered on, the UEFI firmware of the present invention is executed by the processor of the computer system 100. The UEFI firmware will first enter a Security (SEC) phase, wherein no memory has yet been initialized in the computer system 100. In the present phase, since no memory has yet been initialized, the processor's cache is used as a Random Access Memory (RAM) to pre-verify the central processing unit (CPU), the chipset, and the main board. Next, the UEFI firmware enters the Pre-EFI Initialization (PEI) phase, wherein the CPU, the chipset, the main board, and the memory of the computer system 100 are initialized. In the Driver Execution (DXE) phase, boot services, runtime services, and driver execution dispatcher services may be executed to initialize any other hardware in the computer system 100. Following the DXE phase, the UEFI firmware enters into the Boot Device Selection (BDS) phase. In the BDS phase, attempts are made to initialize console devices as well as various drivers corresponding to the boot loader for the Operating System. In the Transient System Load (TSL) phase, control is handed off to the Operating System to continue the start up of the computer system 100 before reaching the Runtime (RT) phase of normal operation of the computer system 100.

Figure 4A:
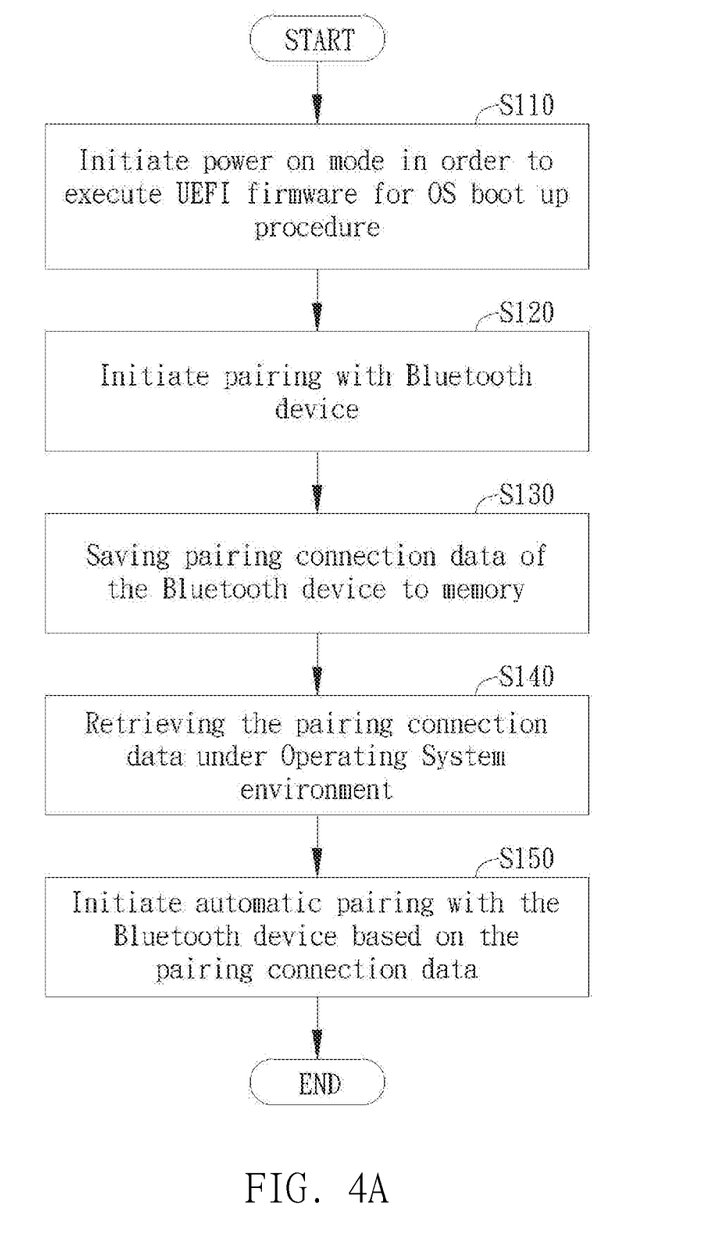
FIG. 4A is an embodiment of a flowchart of the method of the present invention.

FIG. 4A illustrates an aspect of the embodiment of the present invention. As shown in FIG. 4A, a method for sharing a pairing connection data of a Bluetooth device between the UEFI firmware and the operating system 202 is disclosed. In the present embodiment, the method includes steps S110 to S150 and describes the sharing of the pairing connection data in the direction of the UEFI firmware to the operating system 202 as the UEFI firmware hands off control of the computer system to the operating system 202.

Step S110 includes initiating an power on mode in order to execute the UEFI firmware for the OS boot up procedure. In the present embodiment, the power on mode refers to the computer system 100 being powered on and booted to the UEFI firmware. However, in other different embodiments, the power on mode can also mean the computer system 100 is reset to executing the UEFI firmware.

During the initiation of the power on mode, the computer system 100 will first run through the security (SEC) and Pre-EFI initialization environment (PEI) phases to first verify and initiate the central processing unit, the chipset, and the motherboard of the computer system 100. As the UEFI firmware continues to be executed, the next phase of driver execution environment (DXE) will be reached.

Referring to FIG. 4A, step S120 includes initiating pairing with the Bluetooth device. In the present embodiment, as described previously, the UEFI firmware will initiate and install drivers for detected hardware devices during the DXE phase. In the case of the present invention, any Bluetooth devices that are physically connected to the computer system 100 will be detected and the computer system 100 will try to install corresponding drivers for them.

In one embodiment, a Bluetooth stack is implemented on the UEFI firmware in order to allow the UEFI firmware to communicate with the Bluetooth device wirelessly via Bluetooth communication protocols. In this case, if the computer system 100 is preloaded with drivers for various different types of Bluetooth devices, the UEFI firmware can initiate communication with the Bluetooth device and then search for corresponding drivers from the list of preloaded drivers. In other different embodiments, the UEFI firmware can try to find a generic driver for the Bluetooth device by finding out the type of the Bluetooth device. For instance, the UEFI firmware may find that the Bluetooth device is a keyboard type and subsequently try a generic Bluetooth keyboard driver to initiate the Bluetooth device. After a matching driver is found for the Bluetooth device, the UEFI firmware pairs the Bluetooth device to the computer system 100 such that the Bluetooth device can be used while the UEFI firmware remains being executed in the pre-OS phase.

Step S130 includes saving the pairing connection data of the Bluetooth device to memory. In the present embodiment, the pairing connection data of the Bluetooth device refers to the Bluetooth connection information of successfully connecting or pairing of the Bluetooth device to the computer system 100. The purpose of saving the pairing connection data to memory is so that this information is not lost once the UEFI firmware hands off control to the operating system 202. The present invention provides various different embodiments for the pairing connection data, wherein they will be described in more detail in the following paragraphs accompanying FIGS. 5A to 7C.

Step S140 includes retrieving the pairing connection data under the operating system environment. As mentioned above, after successful pairing between a Bluetooth device to the computer system 100 during the pre-OS phases, the pairing connection data is stored in memory. Once the UEFI firmware hands off control of the computer system 100 to the operating system 202, conventionally this pairing connection data is lost. In the present embodiment, since the pairing connection data was proactively stored into memory before the end of the execution of the UEFI firmware, the pairing connection data is accessible by the operating system 202. Accordingly, when the operating system 202 initiates hardware detection and proceeds to install and/or execute corresponding drivers, the operating system 202 can retrieve the pairing connection data to extract information on the pairing connection between the Bluetooth device (that was previously paired to the computer system 100 during the execution of the UEFI firmware).

Step S150 includes initiating automatic pairing with the Bluetooth device based on the pairing connection data. In the present embodiment, information pertaining to the previous pairing of the Bluetooth device to the computer system 100 during the execution of the UEFI firmware can be extremely useful for the operating system in determining which OS drivers to utilize to drive the Bluetooth device. The information extracted could include the make, manufacturer, type, version, or any other device information of the Bluetooth device. The operating system 202 can then subsequently determine which drivers to match to the Bluetooth device, whereby the operating system 202 can then automatically pair the Bluetooth device to the computer system 100. In other words, without ever having performed pairing between the Bluetooth device and the computer system 10 in the operating system environment, the operating system 202 can still automatically pair up with the Bluetooth device by utilizing the Bluetooth connection data stored in memory by the UEFI firmware. This allows users to experience a seamless control of their Bluetooth device as the computer system 100 transitions from the pre-OS environment to under the OS environment.

Figure 4B:
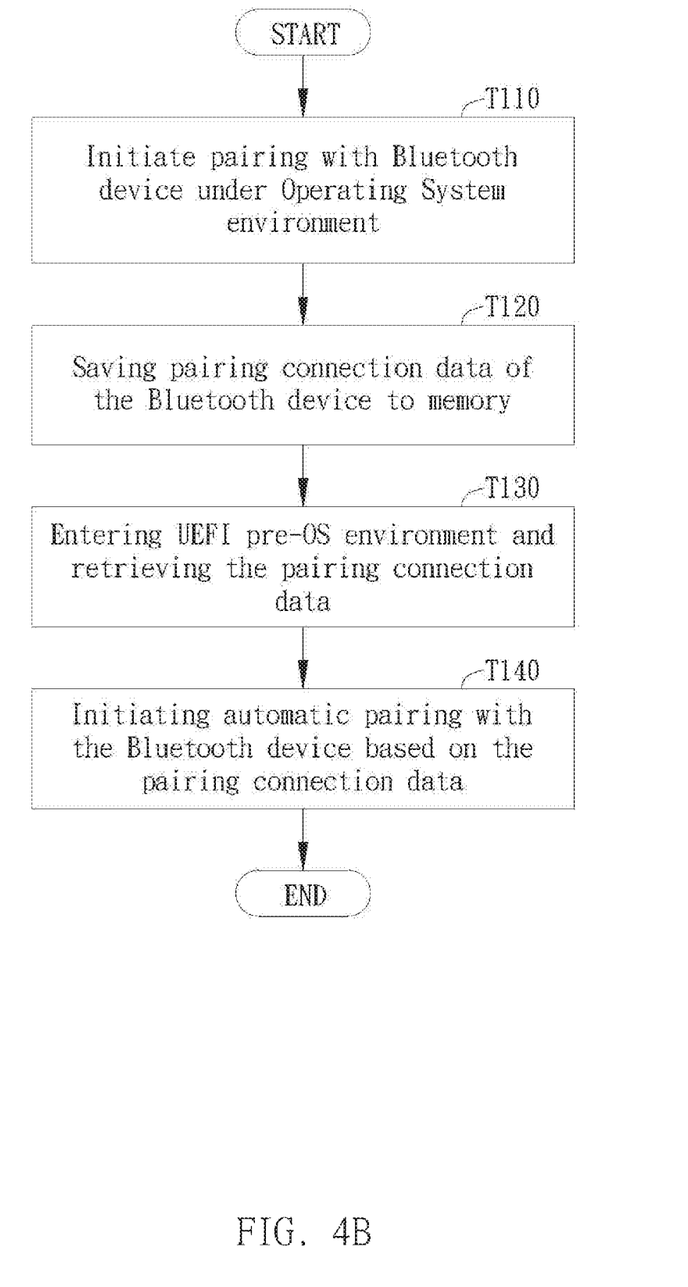
FIG. 4B is another embodiment of FIG. 4A.

FIG. 4B illustrates another embodiment of FIG. 4A, wherein the sharing of the Bluetooth connection data can also occur in the opposite direction from the operating system 202 to the UEFI firmware.

Step T110 includes initiating pairing with the Bluetooth device under the operating system environment. In the present embodiment, it is possible that a Bluetooth device has not been paired with the computer system 100 before, wherein the first time the Bluetooth device is paired to the computer system 100 occurs when the computer system 100 is under the operating system environment. In this instance, the operating system 202 may execute Bluetooth driver processes to drive the Bluetooth device in order to pair the Bluetooth device to the computer system 100.

Referring to FIG. 4B, step T120 includes saving the pairing connection data of the Bluetooth device to memory. In similar fashion to step S130 of FIG. 4A, step T120 illustrates the operating system 202 performing the same task of storing successful pairing information of the Bluetooth device to memory so that this information may be accessible by the UEFI firmware.

Step T130 includes entering into the UEFI pre-OS environment and retrieving the pairing connection data. In the present embodiment, after the operating system 202 has successfully paired up with the Bluetooth device and stored its corresponding pairing connection data to memory, the computer system 100 may be rebooted or restarted to the UEFI firmware the next time the computer system 100 is powered on or restarted. In the present embodiment, as mentioned previously, the Bluetooth device may not have ever been paired to the computer system 100 during the pre-OS environment (ie. during execution of the UEFI firmware). However, since the operating system 202 has already successfully paired up with the Bluetooth device once before in the operating system environment and the corresponding Bluetooth connection data has already been stored in memory, the UEFI firmware can access and retrieve the pairing connection data and proceed to pair up with the Bluetooth device via the Bluetooth stack implemented in the UEFI firmware.

Step T140 includes initiating automatic pairing with the Bluetooth device based on the pairing connection data. In the present embodiment, the UEFI firmware initiates communication with the Bluetooth device via the Bluetooth stack protocols and then confirms that the retrieved connection information extracted from the pairing connection data matches with the Bluetooth device. Once a match is confirmed, the UEFI firmware automatically pairs the Bluetooth device to the computer system 100 such that the Bluetooth device can be used during the pre-OS environment while the UEFI firmware is being executed.

Figure 5A:
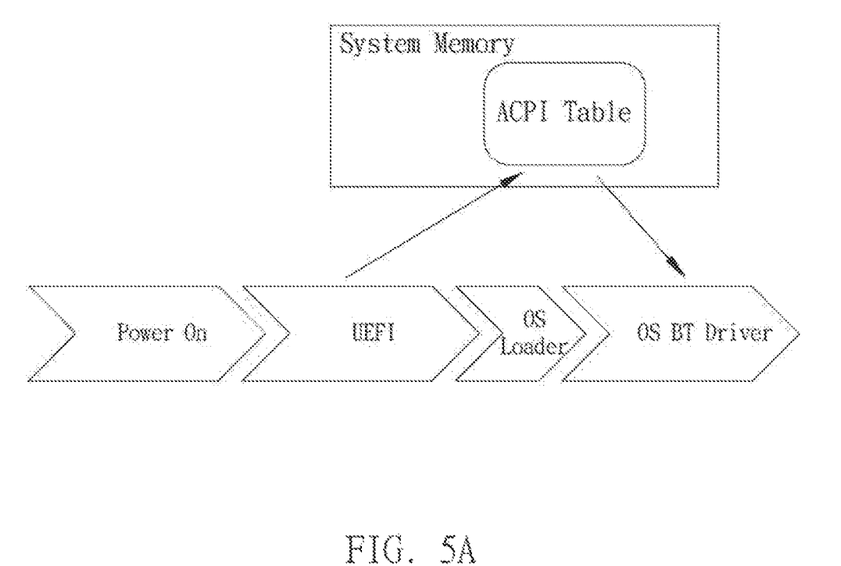
FIG. 5A is an embodiment of storing Bluetooth connection data in the form of an ACPI table.
Figure 5B:
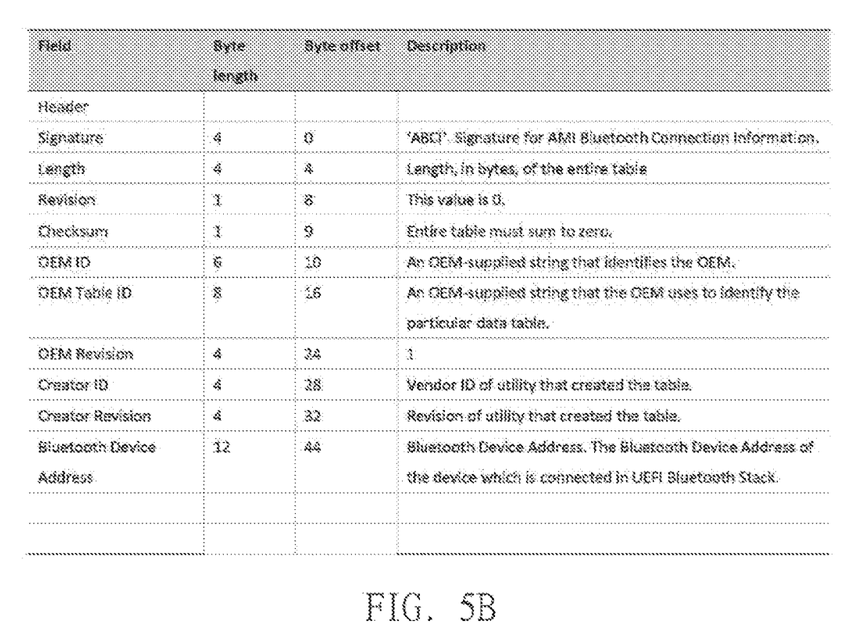
FIG. 5B is an embodiment of the ACPI table of FIG. 5A.

FIG. 5A illustrates an embodiment of the pairing connection data. As illustrated in FIG. 5A, after the computer system 100 is powered on, the UEFI firmware is executed. As mentioned previously, during execution of the UEFI firmware, after the Bluetooth device has been successfully paired to the computer system 100, the UEFI firmware can store the pairing connection data as an Advanced Configuration and Power Interface (ACPI) table. The ACPI provides an open standard for operating systems to use in order to discover and configure computer hardware components. As such, since this data format is directed towards operating systems, the direction of sharing of the pairing connection data is from the UEFI firmware to the operating system 202. However, in other different embodiments, the UEFI firmware may be configured to accept pairing connection data in the ACPI table format. As illustrated in FIG. 5B of an embodiment of the pairing connection data in the ACPI table format, information pertaining to the OEM ID, version, Bluetooth device address, and other related information may be included in the ACPI table. Once the UEFI firmware has encoded the pairing connection data in ACPI table format into the memory, there operating system 202 that is subsequently loaded up after the end of execution of the UEFI firmware can retrieve the ACPI table from memory in order to automatically pair up the Bluetooth device to the computer system 100 under the operating system environment.

Figure 6A:
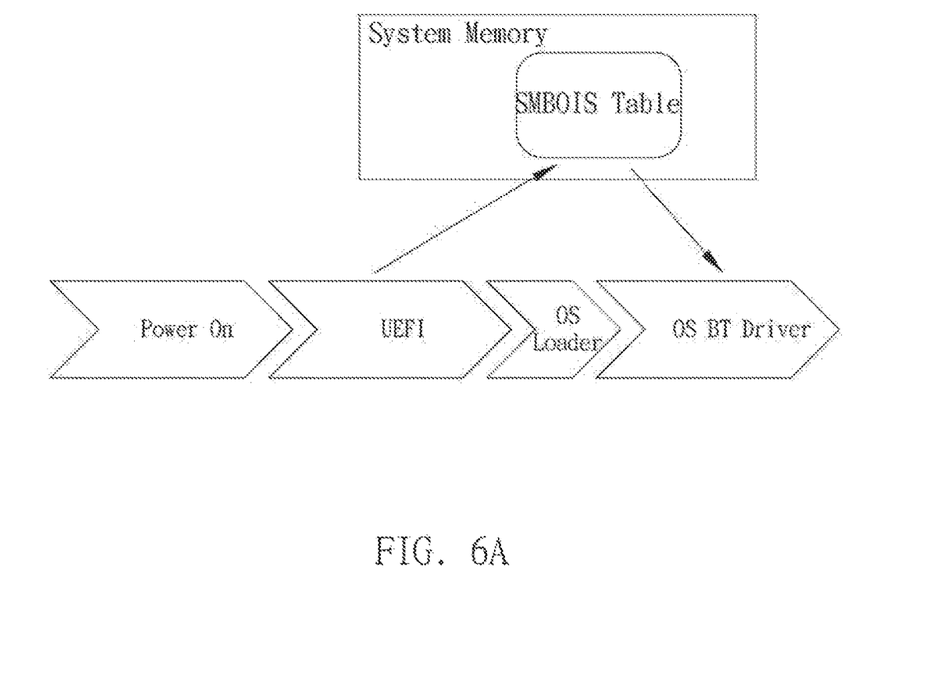
FIG. 6A is an embodiment of storing Bluetooth connection data in the form of a SMBIOS Table.
Figure 6B:
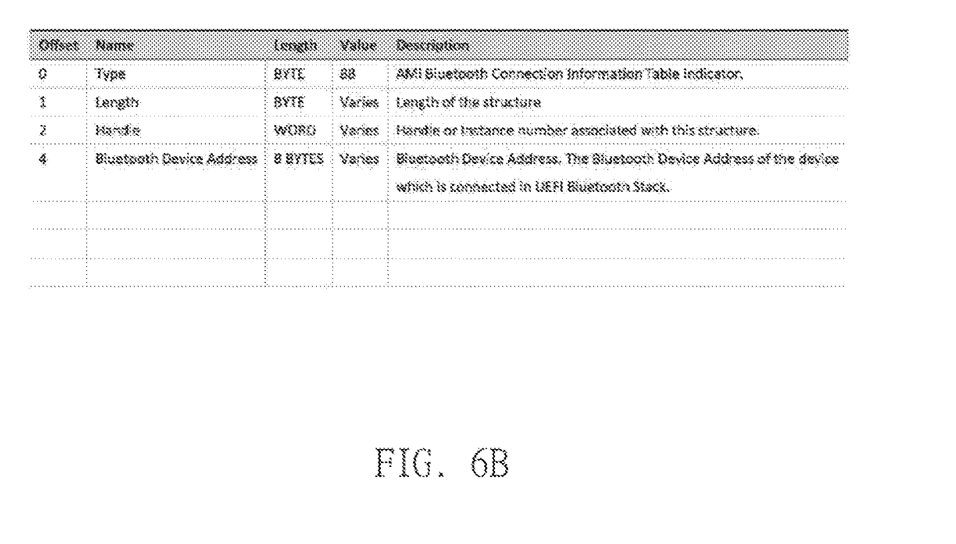
FIG. 6B is an embodiment of the SMBIOS table of FIG. 6A.

Referring to FIGS. 6A and 6B, FIG. 6A is another embodiment of the pairing connection data of the present embodiment, wherein FIG. 6B is an embodiment of the data format of the pairing connection data of FIG. 6A. As illustrated in FIG. 6A, the pairing connection data can alternatively be implemented as a System Management BIOS (SMBIOS) table. The SMBIOS specification defines data structures and access methods that can be used to read information stored in the BIOS of the computer system 100. As shown in FIG. 6B, an embodiment of the pairing connection data formatted in the SMBIOS table data structure is illustrated. By encoding the pairing connection data in the SMBIOS data structure, the pairing connection information can be accessible by a wide variety of different operating systems, such as Microsoft Windows 10 and Linux based operating systems. In the same manner as the previous embodiment, after the pairing connection data is encoded in the SMBIOS table into the memory, the operating system 202 can access and retrieve the pairing connection data and automatically pair the Bluetooth device to the computer system 100 under the operating system environment.

Figure 7A:
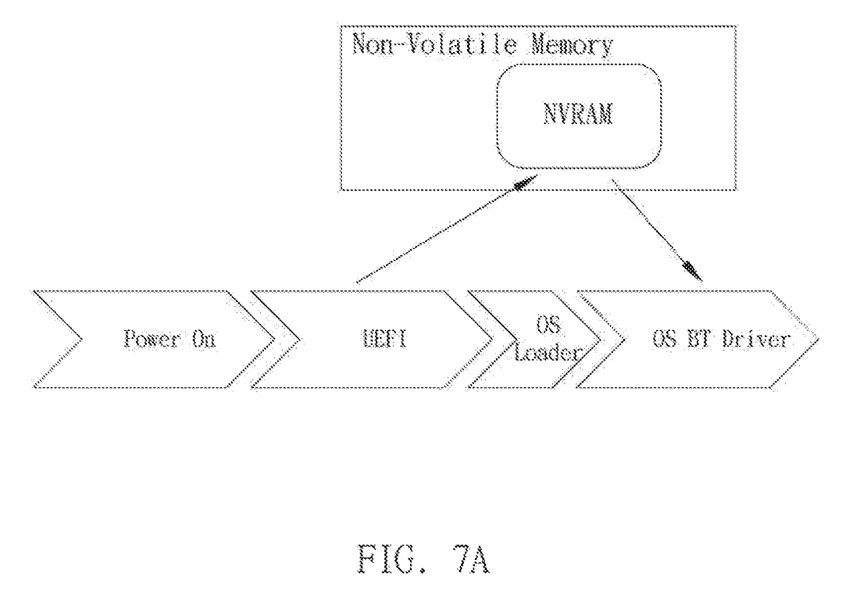
FIG. 7A is an embodiment of storing Bluetooth connection data in the form of an UEFI variable.
Figure 7B:
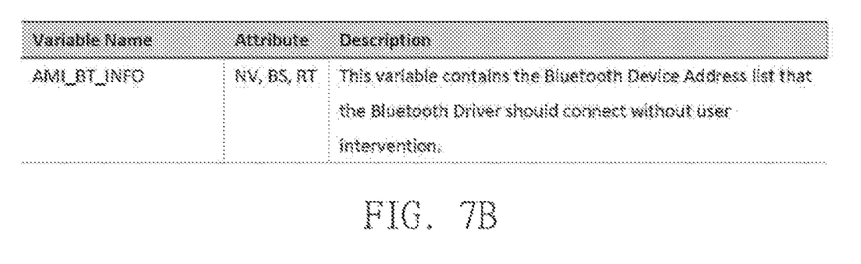
FIG. 7B is an embodiment of the UEFI variable.
Figure 7C:
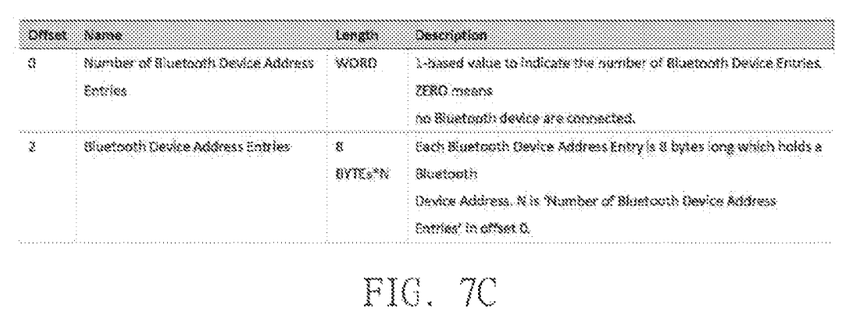
FIG. 7C is an embodiment of buffer format of the UEFI variable.

FIG. 7A illustrates another embodiment of the pairing connection data that allows bidirectional sharing between the UEFI firmware and the operating system 202. In the present embodiment, the pairing connection data is encoded and stored in memory as one or more UEFI variable. The advantage to this format is that both the UEFI firmware and the operating system 202 are UEFI compliant, and therefore when the pairing connection data is stored as an UEFI variable, both the UEFI firmware and the operating system 202 are able to easily access and read the pairing connection data. As an example, the UEFI variable may be given the name "AMI_BT_INFO" and given an attribute as shown in FIG. 7B. In other embodiments, the UEFI variable buffer format may be implemented similar to the format illustrated in FIG. 7C.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A computer implemented method comprising:
   initiating power on mode in order to execute UEFI firmware for OS boot up procedure;
   initiating, by utilizing the UEFI firmware, pairing with a Bluetooth device;
   saving, by utilizing the UEFI firmware, a pairing connection data of the Bluetooth device to memory in an operating system readable form; and
   retrieving, by utilizing an operating system, the pairing connection data saved in the operating system readable form by the UEFI firmware during a period that the operating system initiates hardware detection and proceeds to install and/or execute corresponding drivers, to allow the operating system determine which drivers to match to the Bluetooth device according to the pairing connection data and automatically re-pair the Bluetooth device to the computer system according to the pairing connection data.

2. The method of claim 1, further comprising:
   generating an ACPI table as the pairing connection data; and
   saving the ACPI table to memory.

3. The method of claim 2, further comprising:
   building the ACPI table via UEFI Bluetooth driver by transforming connection information of the Bluetooth device into the ACPI table.

4. The method of claim 3, further comprising:
   retrieving the ACPI table from the memory via a OS Bluetooth driver under the Operating System environment; and
   initiating connection to the Bluetooth device with the OS Bluetooth driver based on the connection information in the ACPI table.

5. The method of claim 1, further comprising:
   generating a SMBIOS table as the pairing connection data; and
   saving the SMBIOS table to memory.

6. The method of claim 5, further comprising:
   building the SMBIOS table via UEFI Bluetooth driver by transforming connection information of the Bluetooth device into the SMBIOS table.

7. The method of claim 6, further comprising:
   retrieving the SMBIOS table form the memory via a OS Bluetooth driver under the Operating System environment; and
   initiating connection to the Bluetooth device with the OS Bluetooth driver based on the connection information in the SMBIOS table.

8. The method of claim 1, further comprising:
   generating a UEFI variable as the pairing connection data; and
   saving the UEFI variable to memory.

9. The method of claim 8, further comprising:
   creating the UEFI variable via UEFI Bluetooth driver by transforming connection information of the Bluetooth device into the UEFI variable.

10. The method of claim 9, further comprising:
    retrieving the UEFI variable from the memory via a OS Bluetooth driver under the Operating System environment; and
    initiating connection to the Bluetooth device with the OS Bluetooth driver based on the connection information in the UEFI variable.

11. A Computer System comprising:
    a memory; and
    computer-readable instructions stored at the memory and executable by a microprocessor to:
    initiating power on mode in order to execute a UEFI firmware for OS boot up procedure;
    initiating, by utilizing the UEFI firmware, pairing with a Bluetooth device;
    saving, by utilizing the UEFI firmware, a pairing connection data of the Bluetooth device to memory in an operating system readable form; and
    retrieving, by utilizing an operating system, the pairing connection data saved in the operating system readable form by the UEFI firmware during a period that the operating system initiates hardware detection and proceeds to install and/or execute corresponding drivers, to allow the operating system determine which drivers to match to the Bluetooth device according to the pairing connection data and automatically re-pair the Bluetooth device to the computer system according to the pairing connection data.

12. The computer system of claim 11, wherein the instructions are further to:
    generating an ACPI table as the pairing connection data; and
    saving the ACPI table to memory.

13. The computer system of claim 12, wherein the instructions are further to:
  building the ACPI table via UEFI Bluetooth driver by transforming connection information of the Bluetooth device into the ACPI table.

14. The computer system of claim 13, wherein the instructions are further to:
  retrieving the ACPI table from the memory via a OS Bluetooth driver under the Operating System environment; and
  initiating connection to the Bluetooth device with the OS Bluetooth driver based on the connection information in the ACPI table.

15. The computer system of claim 11, wherein the instructions are further to:
  generating a SMBIOS table as the pairing connection data; and
  saving the SMBIOS table to memory.

16. The computer system of claim 15, wherein the instructions are further to:
  generating a UEFI variable as the pairing connection data; and
  saving the UEFI variable to memory.

17. The computer system of claim 16, wherein the instructions are further to:
  building the SMBIOS table via UEFI Bluetooth driver by transforming connection information of the Bluetooth device into the SMBIOS table.

18. The computer system of claim 17, wherein the instructions are further to:
  retrieving the SMBIOS table form the memory via a OS Bluetooth driver under the Operating System environment; and
  initiating connection to the Bluetooth device with the OS Bluetooth driver based on the connection information in the SMBIOS table.

19. The computer system of claim 11, wherein the instructions are further to:
  generating a UEFI variable as the pairing connection data; and
  saving the UEFI variable to memory.

20. The computer system of claim 19, wherein the instructions are further to:
  creating the UEFI variable via UEFI Bluetooth driver by transforming connection information of the Bluetooth device into the UEFI variable.

21. The computer system of claim 20, wherein the instructions are further to:
  retrieving the UEFI variable from the memory via a OS Bluetooth driver under the Operating System environment; and
  initiating connection to the Bluetooth device with the OS Bluetooth driver based on the connection information in the UEFI variable.

* * * * *